US011105264B2

United States Patent
Todorovic

(10) Patent No.: US 11,105,264 B2
(45) Date of Patent: Aug. 31, 2021

(54) ASYMMETRIC SUBMERGED AIR INTAKE

(71) Applicant: Rolls-Royce Deutschland Ltd & Co KG, Blankenfelde-Mahlow (DE)

(72) Inventor: Predrag Todorovic, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 98 days.

(21) Appl. No.: 16/719,065

(22) Filed: Dec. 18, 2019

(65) Prior Publication Data
US 2021/0189958 A1    Jun. 24, 2021

(51) Int. Cl.
F03B 1/00    (2006.01)
F02C 7/04    (2006.01)

(52) U.S. Cl.
CPC ............ *F02C 7/04* (2013.01); *F05D 2220/32* (2013.01)

(58) Field of Classification Search
CPC .............................. F02C 7/04; F05D 2220/32
USPC ...................................................... 415/208.1
See application file for complete search history.

(56) References Cited

U.S. PATENT DOCUMENTS

| | | | | |
|---|---|---|---|---|
| 2,810,534 A * | 10/1957 | Fandeux | ................. | F02C 7/042 244/58 |
| 3,033,491 A * | 5/1962 | Clark | ................. | B64C 29/0016 244/23 R |
| 3,222,863 A * | 12/1965 | Klees | ..................... | F02C 7/042 138/43 |
| 3,444,872 A * | 5/1969 | Gabbay | ..................... | F02C 7/04 137/15.1 |
| 3,532,305 A * | 10/1970 | Madelung | ............... | F02C 7/042 244/53 B |
| 3,540,221 A * | 11/1970 | Bouiller et al. | ........ | F02C 7/042 60/244 |
| 4,378,097 A * | 3/1983 | Ferguson | ............... | B64D 33/02 137/15.1 |
| 4,425,756 A * | 1/1984 | Ballard | ..................... | F02C 7/05 60/39.092 |
| 5,299,760 A * | 4/1994 | Finch | ..................... | B64D 33/02 244/53 B |
| 6,129,309 A * | 10/2000 | Smith | .................... | B64D 33/02 244/53 B |

(Continued)

OTHER PUBLICATIONS

Frick, Charles W., et al. NACA ACR No. 5120: "An Experimental Investigation of NACA Submerged-Duct Entrances", NACA, Nov. 13, 1945, pp. 28-29, 35 and 56 (Year: 1945).*

(Continued)

*Primary Examiner* — Hung Q Nguyen
*Assistant Examiner* — Anthony Donald Taylor, Jr.
(74) *Attorney, Agent, or Firm* — Timothy J. Klima; Shuttleworth & Ingersoll, PLC

(57) ABSTRACT

The invention regards an asymmetric submerged air intake in a surface of a structure, wherein the air intake includes a submerged ramp extending from the surface. The ramp has a front end, a rear end, a ramp floor and two ramp side walls. The ramp floor is inclined with respect to the surface. At the rear end an entrance to an internal duct of the structure is provided. It is provided that one of the ramp side walls is a straight wall extending straight in the longitudinal direction of the ramp and that the other of the ramp side walls is a curved wall that diverges from the straight wall along the length of the ramp.

20 Claims, 4 Drawing Sheets

(56) References Cited

U.S. PATENT DOCUMENTS

| | | | | |
|---|---|---|---|---|
| 6,520,738 | B2* | 2/2003 | Sheoran | B64D 33/02 |
| | | | | 415/205 |
| 9,045,998 | B2* | 6/2015 | Lo | F02K 3/115 |
| 9,976,480 | B2* | 5/2018 | Prouteau | B64D 33/08 |
| 2005/0274103 | A1* | 12/2005 | Prasad | B64D 33/02 |
| | | | | 60/226.1 |
| 2008/0267762 | A1* | 10/2008 | Jain | B64D 33/02 |
| | | | | 415/2.1 |
| 2018/0209340 | A1* | 7/2018 | Renninger | B01D 45/04 |
| 2019/0195128 | A1* | 6/2019 | Diaz | B64D 29/00 |

OTHER PUBLICATIONS

Frick, Charles W., et al. NACA ACR No. 5120: "An Experimental Investigation of NACA Submerged-Duct Entrances", NACA, Nov. 13, 1945.

* cited by examiner

ASYMMETRIC SUBMERGED AIR INTAKE

The present disclosure relates to an asymmetric submerged air intake.

A NACA intake or NACA scoop is a specific form of a low-drag air intake design in which a gentle ramp and a curvature profile of the walls create counter-rotating vortices which deflect the boundary layer away from the intake and draw in air. A NACA duct allows air to flow into an internal duct with a minimal disturbance to ambient side of the flow. NACA intakes have first been described by Frick, Charles W., et al. NACA ACR No. 5120: "An Experimental Investigation of NACA Submerged-Duct Entrances", NACA, Nov. 13, 1945, the disclosure of which is incorporated herein by reference.

A NACA intake has a longitudinal axis. Air streaming into a NACA intake has a straight direction of flow that is in accordance with the longitudinal axis of the NACA intake. In some applications, it may be desirable to direct the airflow from the NACA intake in the lateral direction. This requires turning of the airflow downstream of the NACA intake by means of deflectors, bent pipes or the like, which causes an undesirable pressure drop.

There is thus a need to provide for an intake design that provides for air with a lateral component in a simple manner.

According to an aspect of the invention, an asymmetric submerged air intake in a surface of a structure is provided. The air intake comprises a submerged ramp extending from the surface, the ramp having a front end, a rear end, a ramp floor and two ramp side walls, wherein the ramp defines a longitudinal direction extending from the front end to the rear end. The front end of the ramp is at the surface. The ramp floor is inclined with respect to the surface. The rear end of the ramp is at an entrance to an internal duct of the structure, wherein the entrance to the internal duct is defined by a lip extending from the surface into the ramp, the ramp floor and the two ramp side walls. It is provided that one of the ramp side walls is a straight wall extending straight in the longitudinal direction of the ramp, and that the other of the ramp side walls is a curved wall that diverges from the straight wall along the length of the ramp. The air intake is thus asymmetric.

Accordingly, a design of a submerged air intake is provided which corresponds to half of a NACA intake, i.e., a NACA intake that has been cut along the longitudinal axis, wherein only one of the remaining halves is used as intake. Accordingly, one of the ramp side walls of the intake is a straight wall and only one of the ramp side walls is a diverging, curved wall as is typical for a NACA intake.

Aspect of the present invention are based on the realization that, with a classical NACA intake, double swirls are created in opposite directions at the two ramp side walls, which are counter-rotating such that no lateral resulting component remains. By forming one of the ramp side walls as a straight wall that extends in the longitudinal direction, only one swirl is created in the air intake, this swirl naturally having a lateral component. Therefore, air entering the intake receives a lateral motion component which allows to feed the inflowing air to a structure or component below the surface in a lateral direction with reduced losses. At the same time, smooth aerodynamic lines of the intake are preserved.

According to an aspect of the invention, at least one opening is formed in the curved side wall. According to this embodiment, inflowing air at least partly exits already the intake in the lateral direction by openings formed in the curved wall. The swirl of the intake is directly used to laterally feed a zone adjacent the intake through openings formed in the curved wall.

In such embodiment, part of the air may still be turned in the internal duct that the air enters behind the intake. However, such turning duct may be reduced in size or have less curvature.

In embodiments, a plurality of openings is formed in the curved wall. For example, there may be provided between 2 and 20 openings. The openings may be formed adjacent to the entrance to the internal duct, i.e., in an area in which the swirl has already well developed. The positioning of the openings may be such that it is adjusted to the points where swirl tends to hit the side wall. The openings may be made in form of simple cutouts in the side walls or in the form of gills.

In embodiments, the at least one opening extends from the bottom of the curved wall as the swirl is of particular strength along the ramp floor. The position of the at least one opening may correspond to the position of vortexes formed in the air intake.

The provision of at least one opening in the curved wall, however, represents an embodiment only. In another embodiment, such openings in the curved wall are not present. In such case, the internal duct connected to the entrance of the air intake comprises a bent section bent in the lateral direction. As the air already has a lateral component, the pressure drop caused by turning the flow is reduced.

The ramp floor comprises a ramp angle which is the angle of the ramp floor with respect to the surface. The ramp angle may be in the range between 5 and 12 degrees. In embodiments, the ramp angle may be in the range between 6 and 8 degrees.

Typically, the ramp floor is flat such that it forms a straight line in a longitudinal sectional view. However, alternatively, the ramp floor may be curved.

In an embodiment, the curved wall comprises, in its course from the front end to the rear end, one inflection point at which a curve that the wall defines in a top view changes its curvature. At the same time, the curved wall may run nearly parallel to the straight wall both at the front end and at the rear end. In between the front end and the rear end, the curved wall first bends outwards and then, behind the inflection point, bends back inwards.

As regards the orientation of the ramp side walls in the vertical direction, it may be provided that the walls run straight in the vertical direction at least adjacent to the surface, i.e., they run perpendicular to the surface. Alternatively, the walls may run in the vertical direction at an angle to the surface different than 90°.

In another embodiment, at least one of the walls is at least partly curved in the lateral direction.

In one embodiment, at least the curved ramp side wall is curved in the lateral direction in a transition zone between the ramp floor and the ramp wall and runs straight in the vertical direction between the transition zone and the surface. Thereby, a smooth transition between the ramp floor and the ramp side wall is provided for. It may be provided that the openings that, in embodiments of the invention, are provided in the curved wall also extend in such transition zone.

According to a further embodiment, the entrance to the internal duct defines a plane, wherein the straight wall that extends straight in the longitudinal direction of the ramp intersects with such plane at a right angle.

In a further aspect the present invention regards a gas turbine engine comprising a surface, wherein the surface comprises a submerged air intake, and wherein the submerged air intake is designed in accordance with the present invention. In embodiments, the surface is the surface of a nacelle of the gas turbine engine or the surface of a casing of the core engine. In each case, air flowing into the air intake is fed in the lateral direction into a nacelle zone or a casing zone, thereby providing efficient cooling in a desired direction and a particular axial zone of the engine.

The invention will be explained in more detail on the basis of exemplary embodiments with reference to the accompanying drawings in which.

Figure 1:
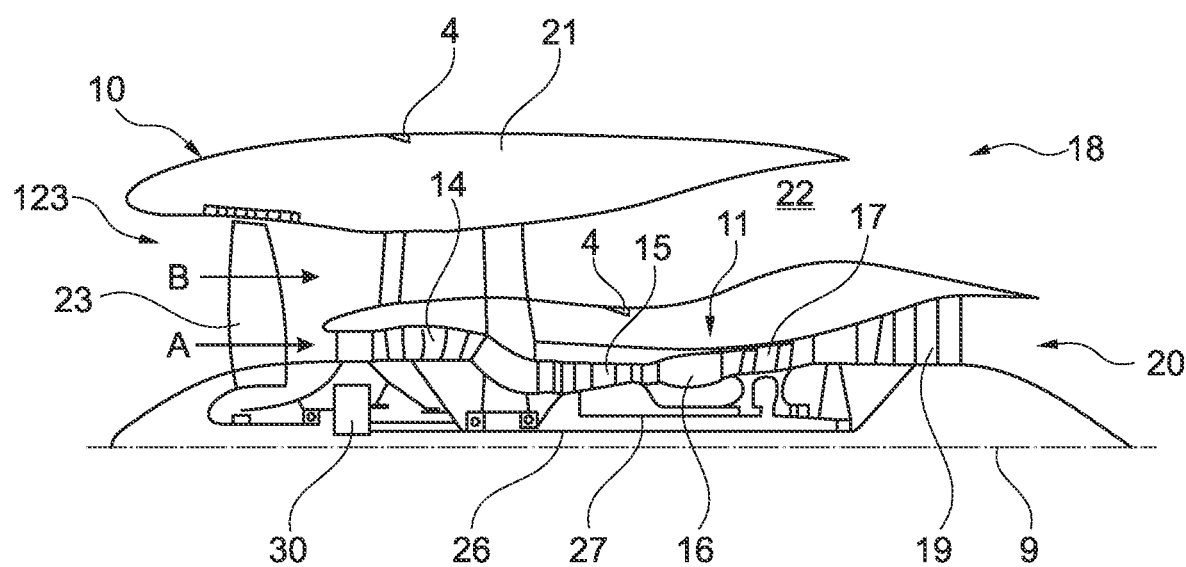
FIG. 1 is a simplified schematic sectional view of a gas turbine engine in which the present invention can be realized.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 1 schematically indicates that air intakes 4 may be integrated in surfaces of the gas turbine engine, such as the surface of nacelle 101 or the surface of a casing of the engine core.

Figure 2:
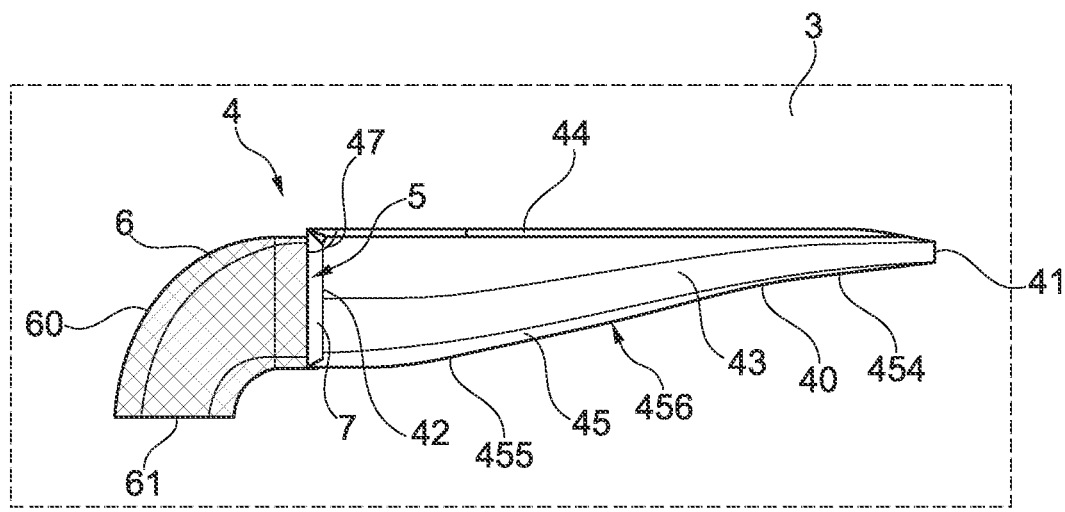
FIG. 2 is a top view of an embodiment of a submerged air intake that comprises a straight ramp side wall and a curved ramp side wall.
Figure 3:
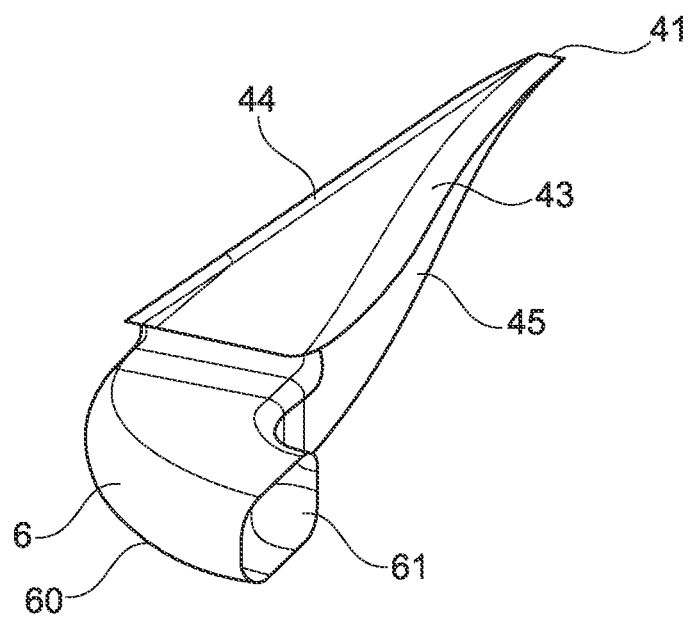
FIG. 3 is a perspective view of the air intake of FIG. 2.
Figure 4:
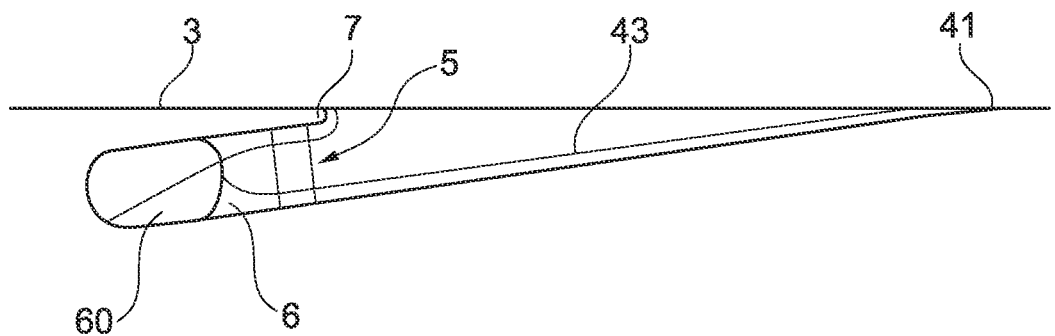
FIG. 4 is a side view of the air intake of FIG. 2.

FIGS. 2 to 4 shown an embodiment of such air intake 4. The air intake 4 is submerged in a surface 3 that may be the surface of a nacelle or engine casing. However, the present invention is not limited to any particular kind of surface and may be implemented in any context in which air or generally a fluid enters an intake. For example, the air intake 4 could alternatively be an air intake in an automobile or a ship.

The air intake 4 comprises a submerged ramp 40. The submerged ramp 40 has a front end 41, a rear end 42, a ramp floor 43 and two ramp side walls 44, 45. One of the ramp side walls 44 extends straight in the longitudinal direction of the ramp 40 towards the rear end 42. The other wall 45 is a curved wall that diverges from the straight wall 44 along the length of the ramp 40, such that the ramp 40 widens from the front end 41 to the rear end 42. The ramp floor 43 is flat. The ramp angle that the ramp floor 43 takes with respect to the surface 3 may be in the range between 5 and 12 degrees, in particular in the range between 7 and 9 degrees.

At the rear end 42 of the ramp 40 an entrance 5 to an internal duct 6 is provided. The entrance is formed by a lip 7 extending vertically downwards from the surface 3, the ramp floor 43 and the two ramp side walls 44, 45, such that the entrance 5 is essentially rectangular. The lip 7 has a curved forward end.

The entrance 5 to the internal duct 6 defines a plane, wherein the straight wall 44 that extends straight in the longitudinal direction of the ramp 40 intersects with such plane at a right angle 47.

The internal duct 6 has a bent area 60 which turns the air, e.g., 90 degrees to the lateral side. The air exits the internal duct 6 through an open end 60.

The curved wall 45 has a curvature such that a first part 454 of the wall 45 adjacent the front end 41 is curved to the outside and that a second part 455 of the wall 45 is curved to the inside, wherein an inflection point 456 is formed in the curve that the ramp side wall 45 defines in the top view of FIG. 2.

The design of the air intake 4 leads to swirls that develop in the ramp 40 when air flows into the ramp 40 towards the internal duct 6. Different than with a classical NACA intake, swirls with one rotational direction only are produced by the intake 4 such that the air naturally develops a lateral component. Thereby, a pressure drop is decreased that the air receives in the bent section of the internal duct 6.

Figure 5:
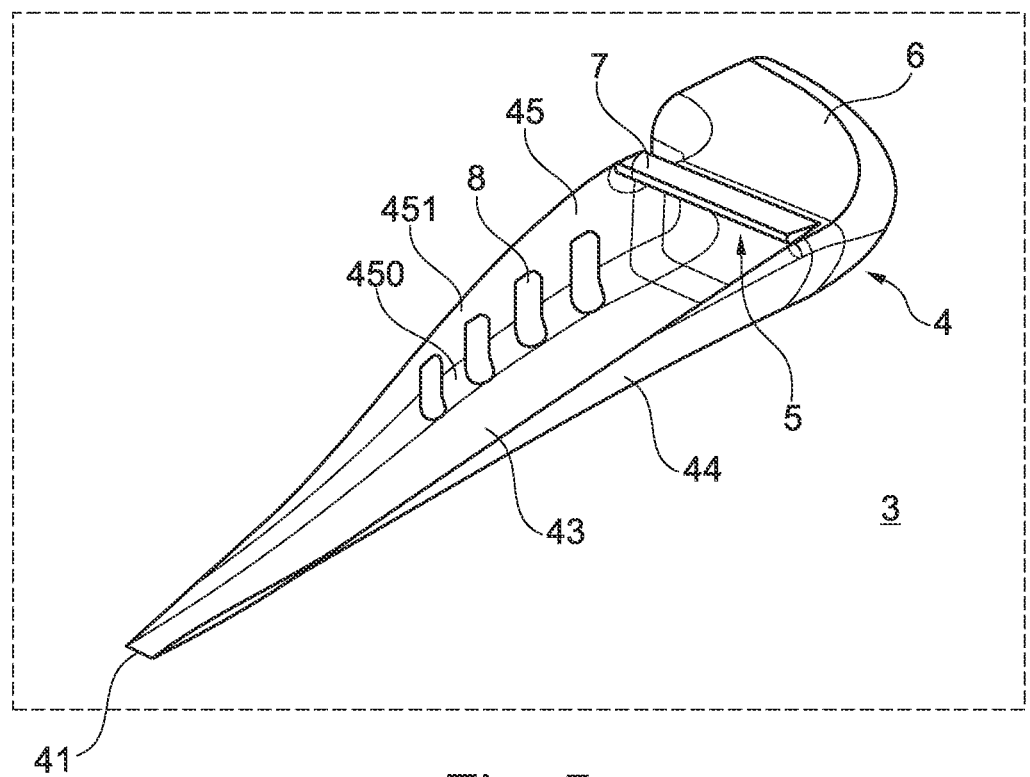
FIG. 5 is a perspective view of a further embodiment of a submerged air intake that comprises a straight ramp side wall and a curved ramp side wall, wherein openings are formed in the curved ramp side wall.
Figure 6:
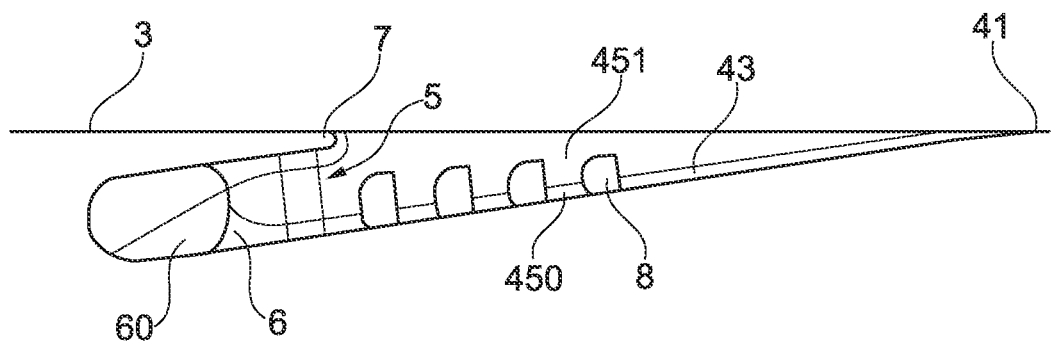
FIG. 6 is a side view of the air intake of FIG. 5.
Figure 7:
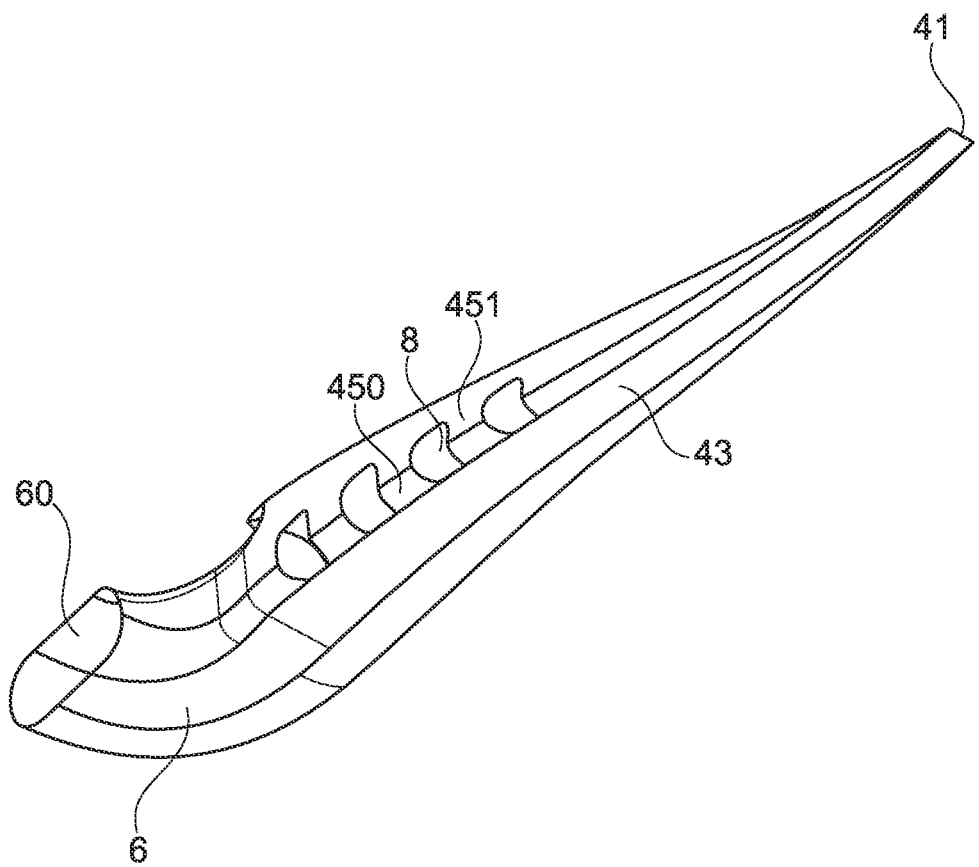
FIG. 7 is a perspective view from below and from the outside of the air intake of FIG. 5.

FIGS. 5 to 7 show a further embodiment of an air intake 4. The duct 40 is generally designed in the same manner as the duct of the embodiment of FIGS. 2 to 4, such that reference is made to these figures. As an additional feature the air intake 4 comprises a plurality of openings 8 which are formed in the curved wall 45. The plurality of openings 8 extend from the bottom of the curved wall 45. The openings 8 can be in form of simple cutouts in the curved side wall or alternatively in the form of gills.

As can be seen in particular in FIG. 5, the curved wall 45 comprises a transition zone 450 between the ramp floor 43 and a straight, vertical part 451 of the wall 45 that extends to the surface 3. In the transition zone 450, the curved wall 45 is curved also in the lateral direction. Thereby, a smooth transition from the ramp floor 43 to the curved wall 45 is achieved in the lateral direction. A similar transition zone can be implemented between the ramp floor 43 and the straight wall 44.

The openings 8 in the curved wall 45 allow air flowing into the ramp 40 and forming swirls to exit the air intake 4 through the openings 8 before reaching the entrance 5 to the internal duct 6. The air or some of the air exits through the openings 8 due to a natural lateral component that the air receives by the swirls. Thereby, air can be provided in an effective manner with little pressure drop in the lateral direction of the air intake 4. The internal duct 6 may be reduced in size.

In further embodiments, openings 8 are also or only realized in the internal duct 6 behind the entrance 5 at the wall side that is the extension of the curved wall 45.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An asymmetric submerged air intake in a surface of a structure, the air intake comprising:
   a submerged ramp extending from the surface, the ramp having a front end and a rear end, a ramp floor, and two ramp side walls, the ramp defining a longitudinal direction extending from the front end to the rear end,
   wherein the front end is at the surface,
   wherein the ramp floor is inclined with respect to the surface,
   wherein the rear end is at an entrance to an internal duct of the structure,
   wherein the entrance to the internal duct is defined by a lip extending from the surface and into the ramp,
   wherein one of the ramp side walls is a straight wall extending straight in the longitudinal direction of the ramp, and
   wherein the other of the ramp side walls is a curved wall that diverges from the straight wall along a length of the ramp.

2. The intake of claim 1, further comprising at least one opening is formed in the curved wall.

3. The intake of claim 2, wherein the at least one opening includes a plurality of openings formed in the curved wall.

4. The intake of claim 2, wherein the at least one opening is formed adjacent to the entrance to the internal duct.

5. The intake of claim 2, wherein the at least one opening extends from a bottom of the curved wall.

6. The intake of claim 2, wherein a position of the at least one opening corresponds to a position of vortexes formed in the air intake.

7. The intake of claim 2, wherein the at least one opening is formed as a cutout in the curved wall or a gill.

8. The intake of claim 1, further comprising the internal duct connected to the entrance, wherein the internal duct comprises a bent section bent in a lateral direction.

9. The intake of claim 1, wherein the ramp floor is arranged at a ramp angle with respect to the surface, wherein the ramp angle is in a range between 5 and 12 degrees.

10. The intake of claim 9, wherein the ramp angle is in a range between 6 and 8 degrees.

11. The intake of claim 1, wherein the ramp floor is flat.

12. The intake of claim 1, wherein the curved wall, in a course from the front end to the rear end, comprises one inflection point at which a curve that the curved wall defines in a top view changes curvature.

13. The intake of claim 12, wherein the curved wall runs parallel to the straight wall both at the front end and at the rear end.

14. The intake of claim 1, wherein the ramp side walls run straight in a vertical direction at least adjacent to the surface.

15. The intake of claim 1, wherein at least one of the ramp side walls is at least partly curved in a lateral direction.

16. The intake of claim 15, further comprising a transition zone positioned between the ramp floor and at least one of the ramp side walls, wherein at least the curved ramp side wall is curved in the lateral direction in the transition zone between the ramp floor and the at least one of the ramp side walls and runs straight in a vertical direction between the transition zone and the surface.

17. The intake of claim 1, wherein the entrance to the internal duct defines a plane and wherein the straight wall intersects with the plane at a right angle.

18. A gas turbine engine comprising a surface, wherein the surface comprises a submerged air intake, the air intake comprising:
   a submerged ramp extending from the surface, the ramp having a front end and a rear end, a ramp floor, and two ramp side walls, the ramp defining a longitudinal direction extending from the front end to the rear end,
   wherein the front end is at the surface,
   wherein the ramp floor is inclined with respect to the surface,
   wherein the rear end is at an entrance to an internal duct of the structure, wherein the entrance to the internal duct is defined by a lip extending from the surface and into the ramp, wherein one of the ramp side walls is a straight wall extending straight in the longitudinal direction of the ramp, and wherein the other of the ramp side walls is a curved side wall that diverges from the straight wall along a length of the ramp.

19. The gas turbine engine of claim 18, wherein the surface is a surface of a nacelle.

20. The gas turbine engine of claim 18, wherein the surface is a surface of a casing of a core of the gas turbine engine.

\* \* \* \* \*